May 26, 1925.  
H. O. BEDGOOD  
1,539,631  
TRUCK FOR EXCAVATORS OF THE DRAG LINE TYPE  
Filed June 10, 1924   3 Sheets-Sheet 3

Inventor  
H.O.Bedgood  
by  
atty.

Patented May 26, 1925.

1,539,631

UNITED STATES PATENT OFFICE.

HUBERT OSWALD BEDGOOD, OF GLASGOW, SCOTLAND, ASSIGNOR TO LOBNITZ & COMPANY LIMITED, OF RENFREW, SCOTLAND.

TRUCK FOR EXCAVATORS OF THE DRAG-LINE TYPE.

Application filed June 10, 1924. Serial No. 719,218.

*To all whom it may concern:*

Be it known that I, HUBERT OSWALD BEDGOOD, of Glasgow, Scotland, a subject of the King of Great Britain, have invented certain new and useful Improvements Relating to Trucks for Excavators of the Drag-Line Type, of which the following is a specification.

This invention relates to the trucks used in connection with land excavators of the "drag line" type. The trucks, of which there are usually four to each excavator, are adapted to run upon rails and they pivotally support the base and platform of the excavator.

As the trucks carry the whole of the excavator with its engine, boom, and bucket and as a drag line excavator is a very heavy and powerful structure provided, in some cases, with a bucket capable of lifting 22 tons of earth, it follows that the supporting trucks are subjected to very great compressive and bending stresses and must therefore be very strongly constructed and it is also important the load be evenly distributed on the axles of the trucks. Further, it is very important each truck be capable of adjusting itself to inequalities in the track as well as to tilting and canting movements of the excavator platform.

At present it is usual to so make the truck that the load is distributed over three bearings, two on the back axle and one on the front; the back axle therefore has to carry the major part of the load and requires to be built with corresponding strength.

The object of the present invention is so to build the truck that it will readily adjust itself to inequalities in the track and to tilting or canting movements of the excavator platform, that the central pivot shall be strongly supported, and that the load shall be evenly distributed over both axles.

The manner of building the improved truck will now be described with reference to the annexed sheet of drawings, whereon, Fig. 1 is a half sectional elevation of the truck on the line 1—1 of Fig. 3.

Referring to the drawings:—

Figure 1:
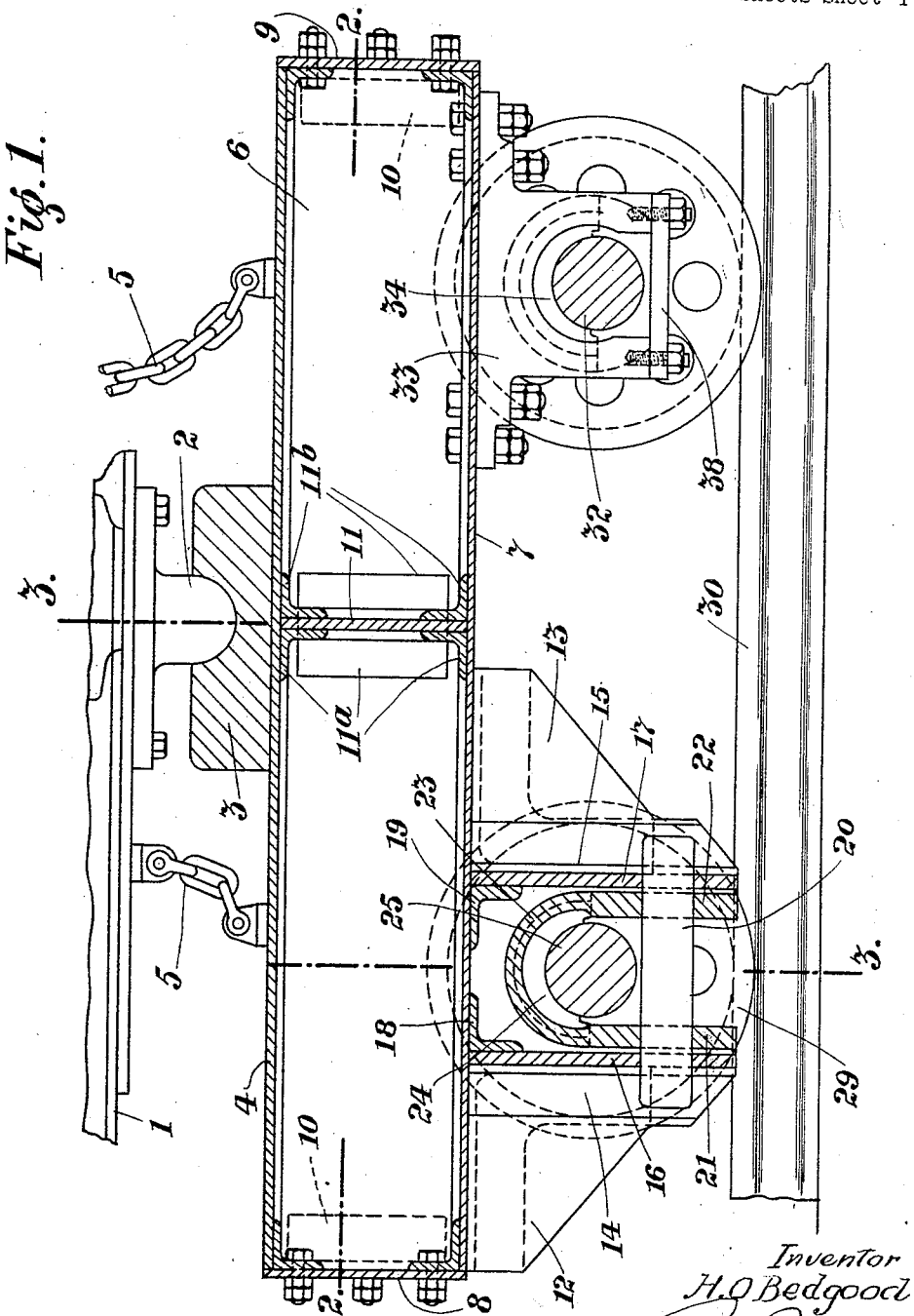
Figure 2:
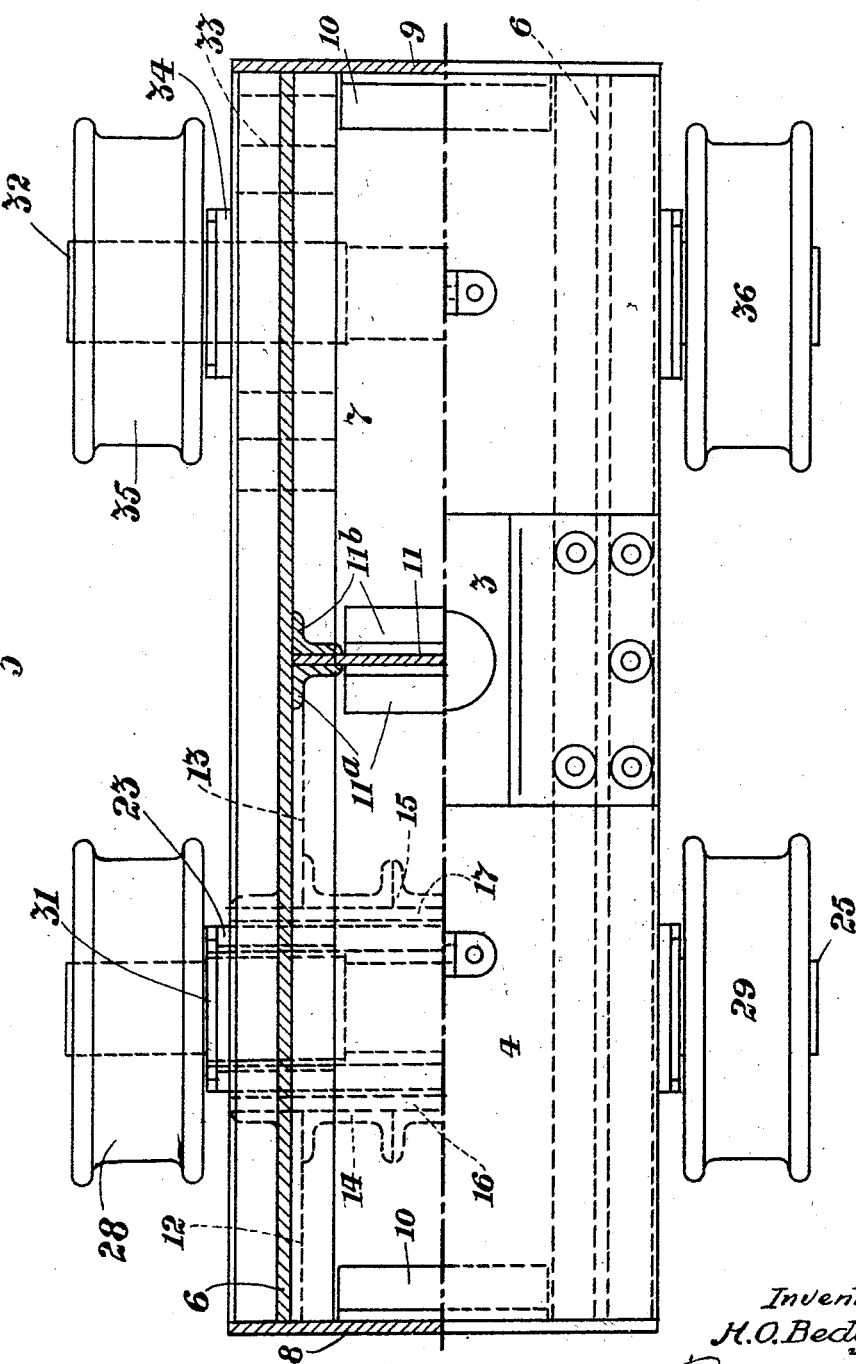
Fig. 2 is a half plan and a half section of the truck, the section being taken on the line 2—2 Fig. 1.
Figure 3:
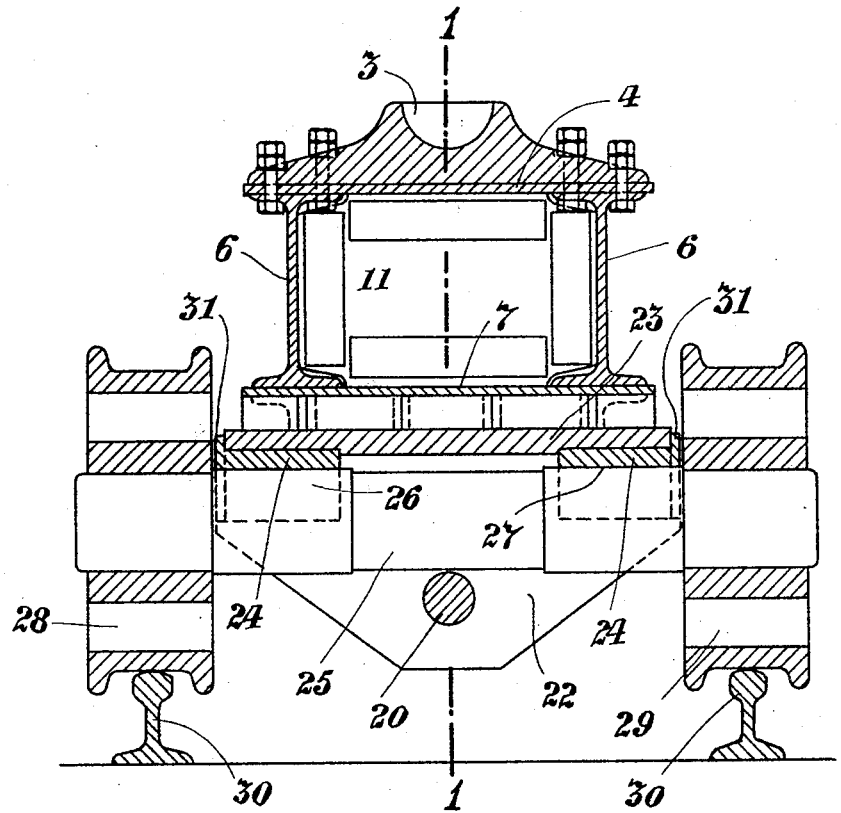
Fig. 3 is a cross sectional view on the line 3—3 Fig. 1.

The excavator base 1 is pivotally mounted on the trucks (of which there are usually four) by means of pivot members 2 one of which is shown at Fig. 1. The improved truck has a strong box like upper structure or body with top 4 carrying the socket block 3 which receives the base pivot 2. The top 4 of the body is supported by strong longitudinal channel girders 6 which are carried by the lower frame 7. Plates 8 and 9 are secured to the top 4 and the lower frame 7 to render the body rigid and to form its ends. Throughout the construction the several joints are reinforced by strengthening plates 10 and a vertical stiffening plate 11, in conjunction with its angle irons 11$^a$, 11$^b$, supports that part of the body which is subjected, through the pivot 2, to the direct load of the excavator. Chains 5, 5, limit the relative movement of the excavator base 1 and the truck.

The rear of the truck body is pivotally supported on the axle 25 by means of a saddle 23 which extends from end to end of the axle and rests on half bushes 24, 24, resting on the axle bearings 26, 27. The bushes have checks 31, 31, for retaining them in place. The saddle has depending portions 21, 22, through which a strong pivot pin 20 passes, this pin, at its end, passing through depending plates 16, 17, secured at their upper ends to the frame 7 by angle brackets 18, 19. The plates 16, 17, are stiffened by channel stiffeners 14, 15, and are, further, rigidly supported at each end by angle brackets 12, 13. With this structure the rear of the truck is carried on the pivot pin 20 whilst stresses communicated to the saddle, are distributed evenly over each bearing bush 24. It is obvious, if the track be unevenly laid with one rail 30 higher than the other, the axle 25 can move about the pivot pin 20 and the wheels adapt themselves to the rails. Also if the body is canted or tilted the wheels 28, 29, will remain on the rails. The arrangement permits of relative movement of the body and back axle.

It is not necessary to have a similar pivotal arrangement for the front axle 32. In this case the body 6 may have bearings each consisting of a saddle bracket 33, half bush 34, bearing on the end of the axle 32, and binding plate 38. The bearings are fitted close to the track wheels 35, 36.

The whole arrangement gives a three point support for the truck body, namely, two bearings on the front axle and the central pivot at the back axle. The structure is very strong and the stresses are so distributed over the axles that there is no liability of their bending at the centre.

Should the truck body, under heavy loads, tend to rise off its rear or front axle, the binding pin 20 and plates 38 come into action and retain the parts in place.

Having now fully described my invention what I claim and desire to secure by Letters Patent is:—

1. A supporting truck for a drag-line excavator having a body, a wheel-carrying axle, a saddle on the body and having bearing on the axle, the saddle depending below the axle, and a pivot pin connecting the opposing parts of the saddle below the axle.

2. A supporting truck for a drag-line excavator having a body, a wheel-carrying axle, a saddle on the body and having bearing on the axle, the saddle depending below the axle, and a pivot pin connecting the opposing parts of the saddle centrally below the axle.

3. A supporting truck for a drag-line excavator having, in combination, a body, an axle, a wheel near each end of the axle, a bearing bush adjacent to each wheel, a saddle bearing on both bushes, plates depending from the body, and a pivot pin connecting the saddle to the plates and located centrally below the axle.

4. A supporting truck for a drag-line excavator having, in combination, a body, an axle, a wheel near each end of the axle, a bearing bush adjacent to each wheel, a saddle of inverted U shape bearing on both bushes, plates depending from the body, and a pivot pin connecting the saddle to the plates and located centrally below the axle.

5. A supporting truck for a drag-line excavator having, in combination, a box-like body, a pivot socket carried by the body and adapted to support the excavator, two axles to support the body and pivotal means associated with one of the axles and arranged below the centre thereof whereby the body can adjust itself to inequalities in the track and to tilting and canting movements of the excavator platform.

6. A supporting truck for a drag-line excavator having, in combination, a body, an axle, a wheel near each end of the axle, a bearing bush adjacent to each wheel, a saddle bearing on both bushes, portions depending from the saddle on either side of the axle, plates depending from the body, stiffeners connected to said plates and to the body, angle brackets connected to said plates and said body, and a pivot pin connecting the depending portions of the saddle to the plates and located centrally below the axle.

7. A supporting truck for a drag-line excavator having, in combination, a box-like body, a pivot socket carried by the body to support the excavator, body stiffening means below the socket, two axles to support the body, a wheel near each end of each axle, a bearing bush adjacent to each wheel, one saddle bearing on both the back axle bushes, plates depending from the body adjacent to said saddle, a pivot pin connecting the saddle to the plates and located centrally below the axle, two saddle brackets for the front axle, one bearing on each of the bearing bushes, and a binding plate for each saddle bracket.

In testimony whereof I affix my signature in presence of two witnesses.

HUBERT OSWALD BEDGOOD.

Witnesses:
JOHN BILLYARD JANSON,
MARY GREEN.